United States Patent
Elpers

(10) Patent No.: US 11,933,062 B2
(45) Date of Patent: Mar. 19, 2024

(54) VIBRATION DAMPING ANCHORING SYSTEM

(71) Applicant: Philip John Elpers, Evansville, IN (US)

(72) Inventor: Philip John Elpers, Evansville, IN (US)

( * ) Notice: Subject to any disclaimer, the term of this patent is extended or adjusted under 35 U.S.C. 154(b) by 469 days.

(21) Appl. No.: 16/924,713

(22) Filed: Jul. 9, 2020

(65) Prior Publication Data
US 2021/0123258 A1  Apr. 29, 2021

Related U.S. Application Data

(60) Provisional application No. 62/927,246, filed on Oct. 29, 2019.

(51) Int. Cl.
*E04H 12/22* (2006.01)
*C09D 123/16* (2006.01)
(Continued)

(52) U.S. Cl.
CPC ....... *E04H 12/2261* (2013.01); *C09D 123/16* (2013.01); *E02D 27/42* (2013.01);
(Continued)

(58) Field of Classification Search
CPC ... E02D 27/42; E04B 1/4157; E04H 12/2261; E04H 12/2253; E04H 17/22; F16B 33/06
See application file for complete search history.

(56) References Cited

U.S. PATENT DOCUMENTS

| 3,311,333 A | * | 3/1967 | Galloway | ............. E04H 12/187 52/298 |
| 3,430,449 A | | 3/1969 | Novotny et al. | |

(Continued)

FOREIGN PATENT DOCUMENTS

| CN | 101333815 A | 12/2008 |
| CN | 108661403 A | 10/2018 |

(Continued)

OTHER PUBLICATIONS

Haydon Bolts Inc. "Bent Anchor Bolts" Product catalog (online), May 9, 2019 (retrieved Jan. 29, 2020); Retrieved from the Internet: https://web.archive.org/web/20190509091 81/https://www.haydonbolts.com/products/bent-anchor-bolts/); pp. 3, 4.

(Continued)

*Primary Examiner* — Jessie T Fonseca
(74) *Attorney, Agent, or Firm* — Maginot, Moore & Beck, LLP

(57) ABSTRACT

An anchoring system for anchoring a post to a concrete body, such as a post for a basketball goal, includes a template for alignment of anchor bolts, which can be J-bolts. The template includes a plate with openings corresponding to openings on a mounting flange of the post, each plate opening including an alignment feature for orienting an anchor bolt perpendicular to the bottom of the plate. A nut engages the anchor bolts beneath the mounting flange of the post. The vertical shank of the anchor bolts is coated with a pre-cured elastomeric composition that has dampening properties, with the thickness of the coating being 5-75% the diameter of the anchor bolt.

20 Claims, 11 Drawing Sheets

(51) Int. Cl.
*E02D 27/42* (2006.01)
*E04B 1/41* (2006.01)
*E04H 17/22* (2006.01)
*F16B 33/06* (2006.01)
*A63B 63/08* (2006.01)
*A63B 71/02* (2006.01)

(52) U.S. Cl.
CPC ....... *E04B 1/4157* (2013.01); *E04H 12/2253* (2013.01); *E04H 17/22* (2013.01); *F16B 33/06* (2013.01); *A63B 63/083* (2013.01); *A63B 71/023* (2013.01); *A63B 2071/024* (2013.01)

(56) References Cited

U.S. PATENT DOCUMENTS

| | | | |
|---|---|---|---|
| 3,458,184 A | | 7/1969 | Schlosser |
| 3,642,937 A | * | 2/1972 | Deckert et al. ...... C08G 59/188 |
| | | | 411/930 |
| 3,805,533 A | | 4/1974 | Askey et al. |
| 4,443,132 A | | 4/1984 | Kotulla et al. |
| 4,862,992 A | * | 9/1989 | Melfi .................. E04H 12/2261 |
| | | | 181/284 |
| 5,050,364 A | * | 9/1991 | Johnson .............. E04B 1/4157 |
| | | | D8/387 |
| 5,232,774 A | | 8/1993 | Otsuka et al. |
| 5,901,525 A | | 5/1999 | Doeringer et al. |
| 6,015,139 A | | 1/2000 | Weber |
| 6,783,472 B1 | * | 8/2004 | Stanford ............... A63B 71/028 |
| | | | 248/650 |
| 6,929,571 B2 | | 8/2005 | Jesch et al. |
| 7,814,710 B2 | | 10/2010 | Foglia |
| 8,037,651 B2 | * | 10/2011 | Dent ....................... E02D 27/32 |
| | | | 52/297 |
| 2003/0196393 A1 | * | 10/2003 | Bowman ................ E01F 9/681 |
| | | | 362/431 |
| 2009/0272053 A1 | * | 11/2009 | Dent .................... E04H 12/2261 |
| | | | 52/699 |
| 2010/0107545 A1 | * | 5/2010 | Montague ............ E04B 1/4157 |
| | | | 52/745.19 |
| 2018/0251996 A1 | * | 9/2018 | Roy .................... E04H 12/2284 |
| 2019/0112829 A1 | * | 4/2019 | Manos ................. E04B 1/2604 |

FOREIGN PATENT DOCUMENTS

| | | | |
|---|---|---|---|
| CN | 108677997 A | | 10/2018 |
| DE | 19930063 A1 | | 3/2000 |
| DE | 102010054157 A1 | | 6/2012 |
| EP | 1114904 A1 | * | 7/2001 ......... E04H 12/2261 |
| KR | 101200546 A | | 4/2012 |

OTHER PUBLICATIONS

International Search Report corresponding to International Application No. PCT/US2020/057340, dated Feb. 17, 2021 (5 pages).

* cited by examiner

VIBRATION DAMPING ANCHORING SYSTEM

PRIORITY CLAIM

This application is a utility filing from and claims priority to provisional application No. 62/927,246, filed on Oct. 29, 2019, the entire disclosure of which is incorporated herein by reference.

BACKGROUND

The present disclosure generally relates to systems for anchoring a post, and particularly to systems that provide vibration damping.

An outdoor post is sometimes anchored to the ground by bolting the post to a piece of concrete that is at least partially buried in the ground. For instance, an outdoor basketball goal G is often mounted on a steel post P that is anchored to the ground in such a manner, as shown in FIG. 11. A typical basketball goal anchoring system includes a rectangular plate 100 and a plurality of anchor bolts 102 that each have one end that is embedded in a concrete body C, which is itself buried in the ground to a depth of about 24 inches. The opposite, threaded ends of the bolts project vertically upward from the concrete body to engage a mounting base plate B of the post. An assortment of nuts and washers N are placed on the bolts to fix the rectangular plate to the bolts and to fix the mounting base plate of the post to the rectangular plate. Prior to installation of the mounting base plate, a nut is typically threaded onto each bolt so that the mounting base plate rests on several nuts. Each nut can be independently raised or lowered by twisting the nut, so that in the case of a square, four-bolt configuration, each corner of the mounting base plate can be independently raised or lowered. Such a configuration has the advantage of permitting relatively simple adjustment of the orientation of the backboard so that the backboard can be leveled appropriately. In the assembled state, the threaded ends of the bolts extend upward through the plate and mounting base plate.

In use, a typical basketball goal experiences significant amounts of vibration as the ball strikes the backboard, as the player grabs the rim, or dunks the basketball. Thinner lighter posts, although typically preferred in the current marketplace, are not able to maintain adequate performance standards. This problem is exacerbated when a player puts significant weight on the goal through a maneuver such as slam dunking, because the weight is transmitted through the structure of the basketball goal assembly to the mounting base anchor. Since the base anchor is held tightly by concrete, the forces of the player's weight is absorbed by the post which causes extreme vibrations that continue for undesirable amounts of time, sometimes over a minute or more. These forces in the base plate and post elastically deflect somewhat or wiggle relative to the plate. Although the deflections are small, they are multiplied along the length of the post leading to significant motion of the heavy backboard cantilevered at the end of the oscillating post. The result is a vibration that gives the impression of instability, can even cause basketballs to rebound unpredictably from the backboard, and can move the rim out of position during follow up shots. Professional specifications dictate a goal return to a playable position in three seconds or less after an act of play. Current non-professional goals struggle to meet this specification without creating large, bulky and highly priced systems.

One approach to reducing the vibration is to add damping elements between the post and the backboard. Another approach is to incorporate elastomeric bushings on top of the mounting base plate, between the mounting base plate and the nut engaged to the anchor bolt, to dampen deflection of the mounting base plate. One significant difficulty with this approach is that the elastomeric material of the bushings tends to deteriorate due to environmental conditions, particularly sunlight. The material tends to harden and then become brittle, completely compromising the dampening function of the bushings. This hardening of the elastomer can also compromise the integrity of the entire unit, creating gaps between the elastomer and their supporting nuts or base plate, allowing the unit to shake dangerously and even fail completely during use. Covers that fit over the mounting base plate help protect the bushings, but the covers themselves are subject to deterioration and damage as they are contacted by the basketball players and left exposed to the elements. Furthermore, as the bushings wear and warp, dew and moisture can collect in gaps in the bushing, eventually the hardware beneath the bushing as well as the bushing itself. The elastomeric bushing solution also relies on the correct installation and upkeep by the customer to maintain the integrity of the installation.

In an alternative approach, elements are added between the post and the backboard or behind the backboard so help damped the vibration. But these elements suffer from the same flaws as the elements in the base plate. Weathering and installation can create dangerous gaps in the hardware and their corresponding nuts causing system failure In another method, mass dampers are attached to the post to mitigate and dampen the vibration. Apart from being the most expensive of the current options, large weights, dangerously strong magnets or both are used to absorb the impact forces. Cages must be used to protect the components from both weathering and tampering and even the stray basketball shot. The bulkiness of such a system also leads to increased shipping costs. If such a system breaks, it poses a significant danger to any consumer that gets near it, or that attempts to repair the installation.

Not every force that a basketball goal and damping unit sees is directly front to back, and in fact, most of the forces are not purely perpendicular to the face of the backboard. Forces are applied to the backboard and goal post from all angles, such as from a bank shot, dunk shot from the side, a lay-up or simply hitting the post. During play, a system undergoes three different modes of vibration along thee different axes, which amounts to nine different vibrational modes—namely, longitudinal, transverse, and torsional vibrations along the X, Y and Z axes of the basketball goal. Current market solutions only address a few of these modes, while leaving the others undamped, so that the goal continues to vibrate. To get a post with a heavy backboard on the end to stop vibrating quickly, it is vital to dissipate as many of these modes of vibration as possible to prevent the energy of one vibration mode from feeding another vibration mode and to keep the vibration at the dampers from re-entering the system. An elastomeric damper at the backboard will address three of the nine modes of vibration—X axis longitudinal, Z axis transverse, and Z axis torsion. A sandwiched elastomer in the base is more effective, and can address seven of the nine modes, namely all vibrations except longitudinal along the X and Y axes. However, since longitudinal along the X axis is one of the highest forces experienced by the goal, this is a large problem that leads to longer vibrations patterns. Furthermore, the installation and weathering variance reduce its overall effectiveness and lifetime greatly. Current tuned mass dampers, because of cost restraints, are primarily only able to reduce vibrations in two of the nine modes—along the x axis and transverse on the z axis. No current vibration solution has the ability to be fully customizable at a low price to the consumer. Consequently, there is a need for a cost effective, safe, and long-term solution for damping all nine modes of vibration of a basketball goal.

It is common knowledge that "curb appeal" or aesthetics are a major component of the consumer basketball market. Most units are designed with form being as great a driver as function. As units are usually in the front of a house, or at least visible from the front of the property, it is vital that any solution minimize exposure to maintain the clean appearance of the unit. A point of contention in the market is how to disguise any damper to make it appear less obtrusive. This is impossible to do with above ground dampers as nearly all solutions require some manner of bulky "cover" to protect the damper. These covers are eyesores and decrease the general curb appeal of the basketball units and drive away consumers. Thus, there is a need for a vibration damping solution that does not disturb the aesthetics of the basketball goal.

There is a need for an anchoring system for posts, such as basketball goal posts, that can efficiently dampen all modes of vibrations and yet withstand the outdoor elements with as little safety risk as possible.

SUMMARY OF THE DISCLOSURE

An anchor system for anchoring a post to a concrete body, the post having a mounting flange, the anchor system comprises a template including a plate configured to be embedded in a concrete body with an upper surface of the plate immediately adjacent or exposed at the surface of the concrete. The plate includes a plurality of plate openings distributed around a perimeter of the plate to correspond to openings defined in the mounting flange of the post. The plate further includes an alignment feature with each opening configured to properly align an anchor bolt extending through the opening so that it is perpendicular to the bottom surface of the template. In one embodiment, the alignment feature includes a plurality of tabs extend from the perimeter of the plate below a bottom surface of the plate, each of the plurality of tabs including a wing extending inward beneath the bottom surface of the plate, and each wing including a wing opening. The tabs are arranged so that the wing opening is aligned with a corresponding one of the plurality of plate openings.

The anchor system further comprises a plurality of bolts, one each corresponding to each of the plurality of plate openings, each of the plurality of bolts including an elongated shank with a threaded stem at one end and a bent portion at the opposite end. The elongated shank is sized and configured to extend through a corresponding plate opening and wing opening with the threaded stem above the upper surface of the plate to engage the openings defined in the mounting flange of the post, and sized and configured so that the bent portion is embedded in the concrete body when the plate is embedded in the concrete body. At least a portion of the elongated shank of each of at least one of the plurality of bolts includes a coating of a pre-cured elastomeric composition that has dampening properties. A threaded nut is engaged on the threaded stem of each of the plurality of bolts to bear against the upper surface of the plate.

With the present system, literally any shape and pattern can be formed around the bolt to give the exact damping characteristics to fit the need. If you need more damping in the X-axis than the other two, simply mold it as an ellipse to give more damping in the primary dimensions. Furthermore, value and effectiveness can further be increased by running a vibrational analysis on the anchoring hardware and molding the elastomer to match. The nodal areas would require little thickness whereas the anti-nodal areas could have increased thickness to increase their effectiveness even further without increasing overall costs. No other solution provides such customizability across the wide array of product choices. The weight ranges and sizes of basketball goals vary dramatically and this solution provides easy customizability with little to no change in cost, manufacturing, shipping, installation, durability, or effectiveness.

All basketball systems need to be installed and the enclosed is no exception. It is common practice and knowledge that the less expensive the unit, the more likely it is that the end consumer, or non-professional, will install it. Being that the point of a vibration damper on a basketball unit is to create a less expensive, yet more effective product, installation is a vital component of this invention. The use of coated hardware can reduce the amount of parts needed for common anchor installation by four. It is no longer required to put bolts on the bottom of the template plate, which is a step many customers forget that can lead to incorrect and dangerous installation. The elastomer and new template serve to hold the hardware upright without these nuts during installation. This method also prevents the customer over tightening hardware on the elastomer, deforming and harming it as is present in alternate solutions.

It is common knowledge that "curb appeal" or aesthetics are a major component of the consumer basketball market. The enclosed mitigates this problem completely by burying the damper beneath the concrete or other such medium, completely hiding it from view.

The enclosed does so with little impact on cost, proper anchoring load capacity, a reduction in assembly time and expertise, little to no increase in shipping, increase in curb appeal, and significant increase in overall unit function.

DETAILED DESCRIPTION

Figure 1:
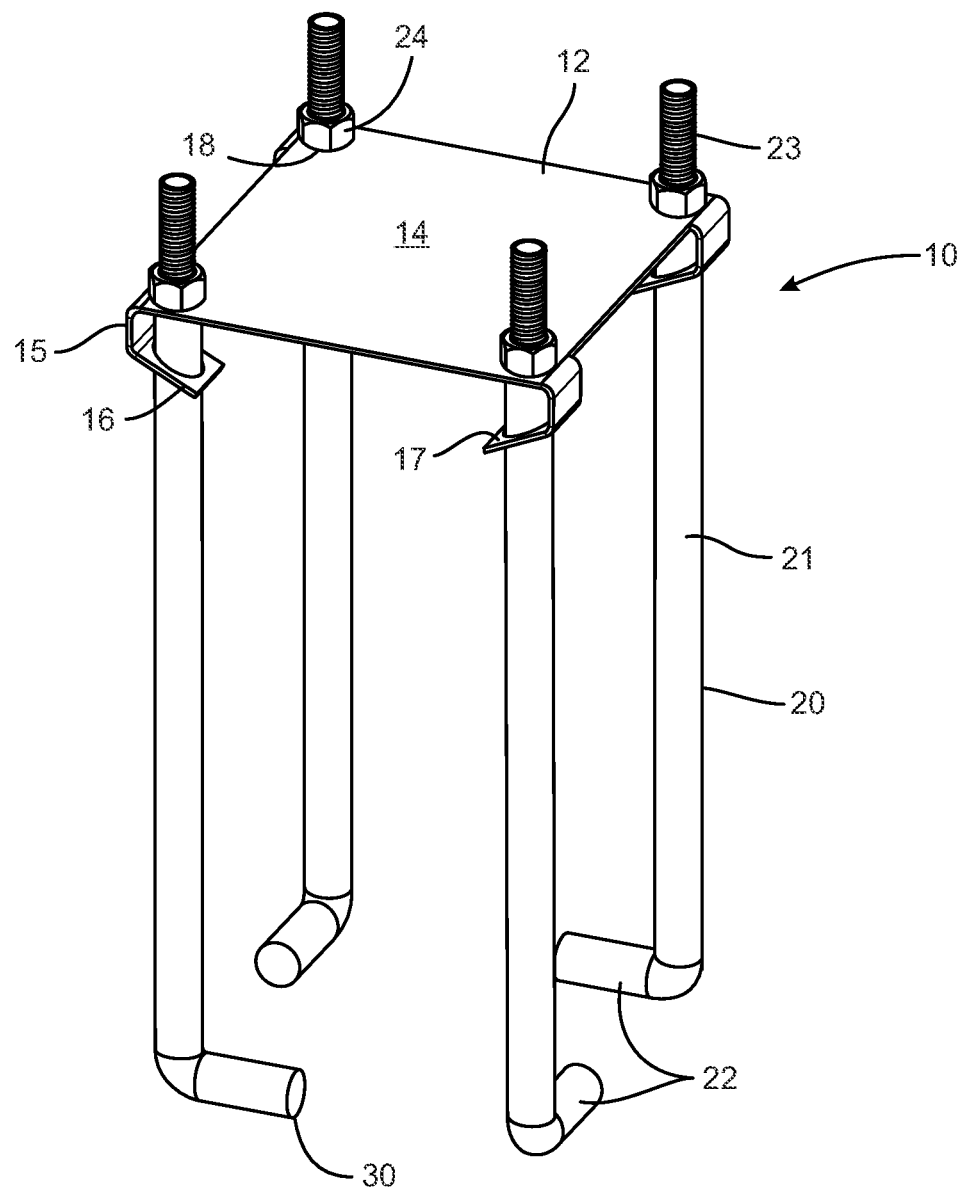
FIG. 1 is a perspective view of an anchoring system according to one embodiment of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Referring to FIG. 1, an anchoring system 10 includes a template 12 and a plurality of anchoring bolts 20. The template 12 includes a plate portion 14 with a plurality of openings 18 uniformly located around the perimeter of the plate portion. The number of openings 18 corresponds to the number of bolts 20 used for the anchoring system. In the illustrated embodiment, four openings, and therefore four bolts, are situated at the corners of a rectangular plate portion. Other configurations are possible, such as triangular or hexagonal for instance, with the anchoring bolts preferably uniformly distributed around the perimeter for a stable support of a post anchored with the system. It is further understood that the arrangement of openings 18 and bolts 20 is also dictated by the mounting feature of the post, as described herein.

The template 12 includes an alignment feature for ensuring that the anchor bolts are aligned perpendicular to the bottom surface of the template. It has been found that angular deviation of the anchor bolts from perpendicular impart additional loads that can lead to failure of the anchor bolts. In one embodiment, the alignment feature includes a plurality of template tabs 15 that extend below the bottom surface of the plate portion 14 and that are arranged around the perimeter of the plate portion. The tabs each include a wing 16 that extends inward beneath the plate portion and that can be arranged to extend at a non-parallel angle relative to the plate portion to form a modified U-shape, as depicted in FIG. 1. The wings include an opening 17 and are oriented relative to the plate portion so that the opening 17 is aligned with an opening 18 in the plate portion. The tabs 15 are precisely configured so that the openings 17, 18 are aligned so that the respective centroids of the openings are colinear, with a line between the centroids being perpendicular to the plate portion 14. The angled aspect of the wings 16 provides a gripping function to hold the anchor bolts in position, as described below. In one specific embodiment, the wings are arranged at an angle of 20-40° relative to the horizontal plane of the plate portion 14.

Figure 7:
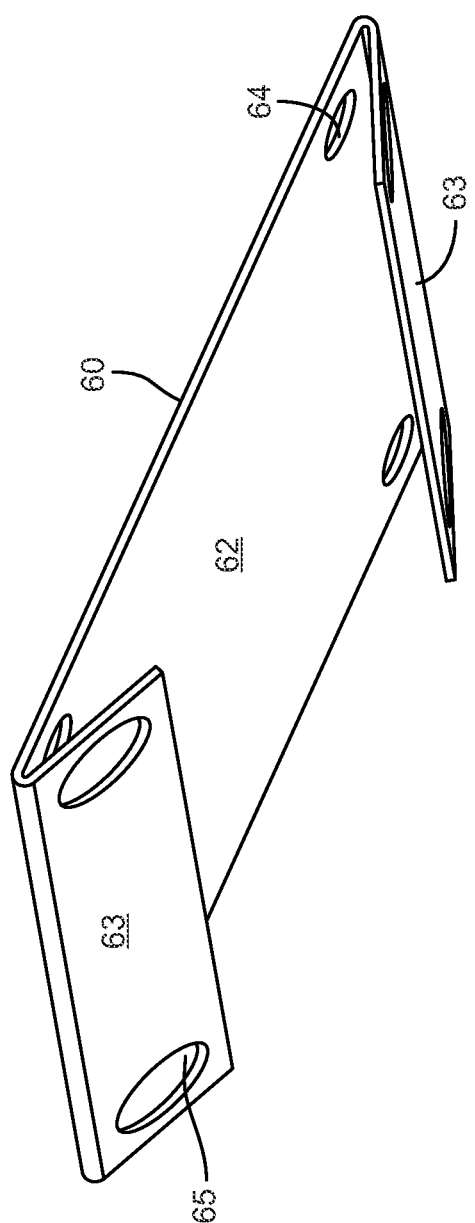
FIG. 7 is a bottom perspective view of a template plate for use in the anchoring system of FIG. 1.

An alternative template 60 is shown in FIG. 7. The template 60 includes a plate portion 62 with openings 64 similar to the template 12. However, rather than incorporate four separate tabs 15, the template 60 includes a single tab 63 on opposite sides of the template, with each tab including two openings 65 aligned with a respective opening 64.

Figure 2:
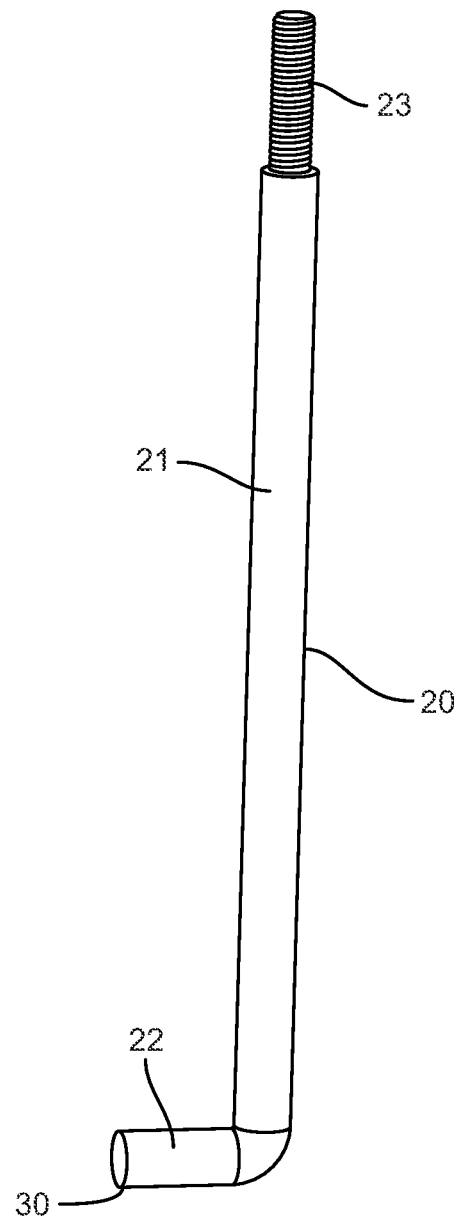
FIG. 2 is a side view of an anchoring bolt used in the system shown in FIG. 1.
Figure 8:
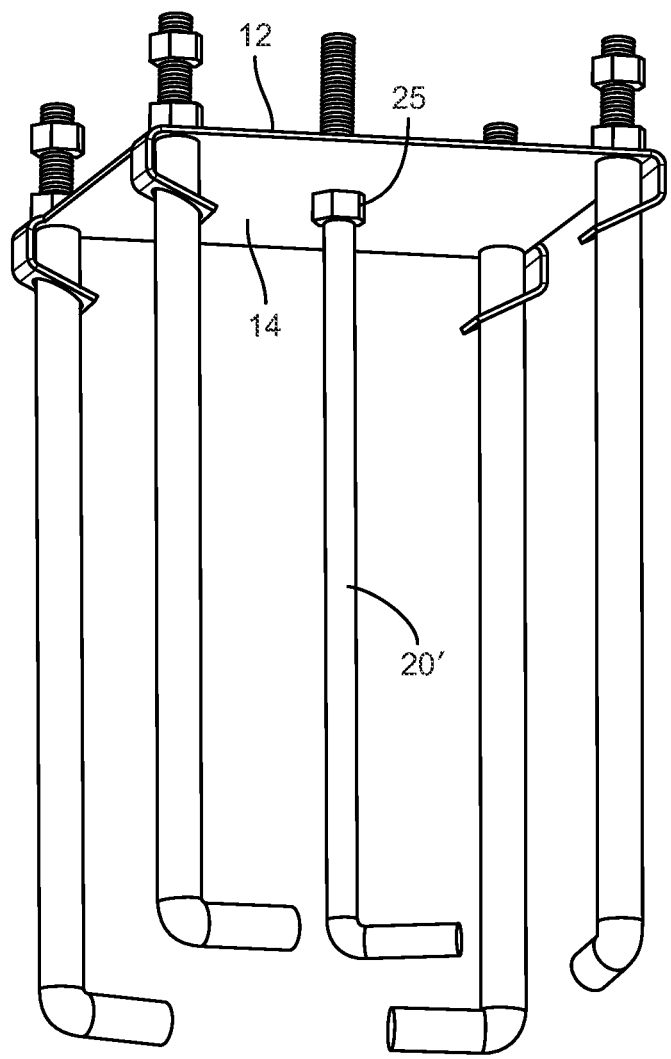
FIG. 8 is a perspective view of an anchoring system according to another embodiment of the present disclosure.

The anchoring bolt 20 is shown in the detail view of FIG. 2. The bolt is L-shaped with a vertical shank 21 and a bent portion 22 that can preferably be bent at a 90-degree angle relative to the vertical shank. The vertical shank 21 has a length of 10-40 inches so that the anchoring system can resist a moment applied as the post P sways, when the bolts are buried in the concrete body C (FIG. 8). The bent portion 22 can have a length of 1-2 inches, which is sufficient to resist bolt pull-out from the concrete C. The upper end of the bolt is threaded to form a threaded stem 23 configured to receive a conventional nut 24 or a washer/nut combination. The threaded stem 23 has a length of 2-3 inches to pass through the template 12, the mounting base plate B of the post P and two nuts or washer/nut combinations. In one important aspect of the present disclosure, at least some segments of the anchoring bolt are provided with a coating 30 of a pre-cured elastomeric composition that has dampening properties. In a specific embodiment the coating 30 is a polyurethane with a Shore A hardness of 50-90. A preferred composition is Sorbothane® which is a thermoset, polyether-based polyurethane viscoelastic material provided by Sorbothane, Inc. In one embodiment, the coating 30 extends along the entire length of the vertical shank 21 and the bent portion 22. The coating acts as a shock absorber and damper as movement of the post P is transmitted through the anchoring system to slight movement of the bolts inside the coating. The coating may also extend over the lower portion of the threaded stem 23 that receives the nut 24, with the understanding that the coating will be disrupted and pushed toward the template 12 as the nut is threaded onto the upper end. The disrupted coating thus serves as a form of gasket to resist water passing through the openings 18 in the template.

In another aspect, the coating can have a thickness and shape that is calibrated to the effective seismic mass of the post P and basketball goal being anchored. Thus, the thickness and shape of the coating 30 can be determined to tune the vibration damping performance of the coated anchor bolts 20. For instance, a heavier post and goal will require a thicker coating to effectively dampen the oscillations of the post while maintaining structural integrity, whereas a lighter post will require a relatively thinner coating to achieve the same result. In the preferred embodiments, the coating 30 is applied on the bolt at a thickness that is 5-75% of the uncoated diameter of the bolt. In a specific embodiment, at least the shank 21 (and optionally the bent portion 22) of the bolts 20 has a basic diameter of ⅝ inch, so the thickness of the coating can be 0.031 to 0.469 inches and the diameter of the coated bolt can range from 0.685 to 1.563 inches. A heavier foal post may require a coating that is not a uniform thickness around the bolt. Thus, in certain embodiments the coating 30 can be elliptical in cross-section with the long axis of the ellipse aligned with the direction of greatest vibration, such as the front-back direction relative to the backboard.

Figure 5:
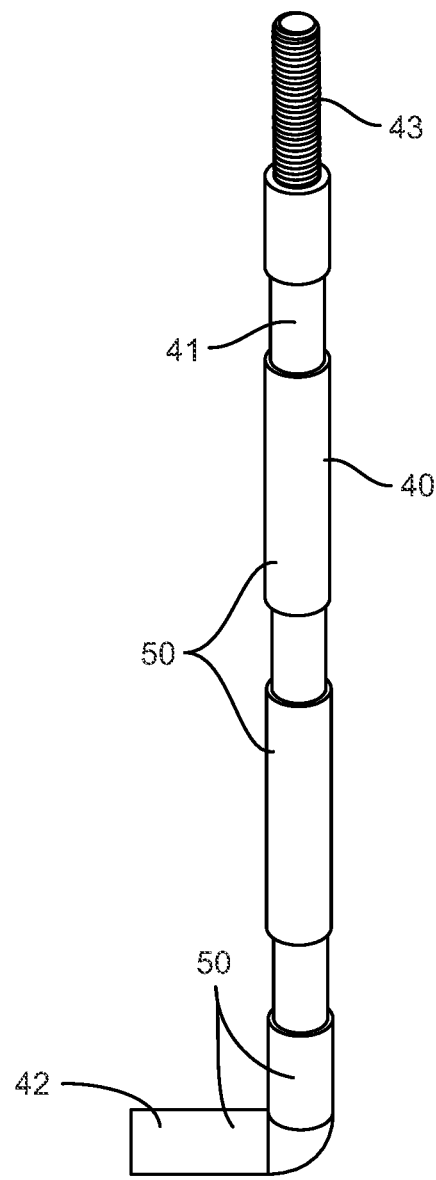
FIG. 5 is a side view of an anchoring bolt according to another embodiment of the present disclosure.

The tuning feature can also be accomplished by varying the extent of the bolt that is coated. Thus, the anchor bolt 40 shown in FIG. 5 includes five strategically placed thicker sections 50 of coating on the underlying bolt 41, with thinner sections on vibrational nodes. The sections 50 can have a non-uniform thickness, such as an elliptical configuration, and the long axis of the ellipse can be oriented along different axes between the different sections. The threaded stem 43 can also be coated in the manner described for the bolt 20. The bent portion 42 is shown with a coating in FIG. 5, although that coating can be eliminated. The dampening performance of the anchoring system can also be tuned by selecting less than all of the anchor bolts to include the coating 30, 50.

It can be appreciated that the openings 18 in the plate portion 14 of the template 12, and the openings 17 in the wings 16 must have a diameter large enough to accommodate the largest coating diameter for the anchor bolts. When accepting the largest diameter coated bolt, the wings can be nearly parallel with the plate. For smaller diameter bolts, the wings 16 can be bent at an angle so that the projection of the opening diameter in a plane parallel to the plate presents a smaller diameter. The bend angle increases as the diameter of the bolt decreases. The openings 18 in the plate portion can be filled with the polyurethane coating when the nut is tightened onto the threaded stem.

Figure 3:
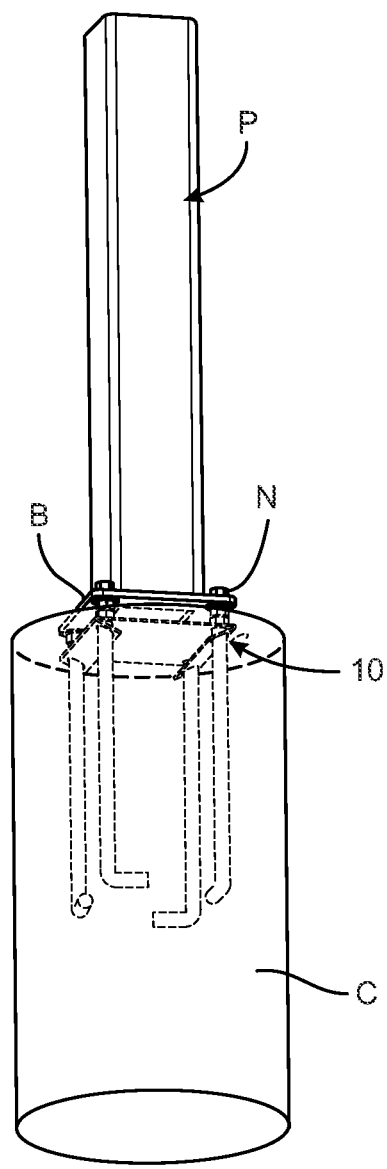
FIG. 3 is a cut-away view of the anchoring system of FIG. 1 anchoring a post in concrete.
Figure 4:
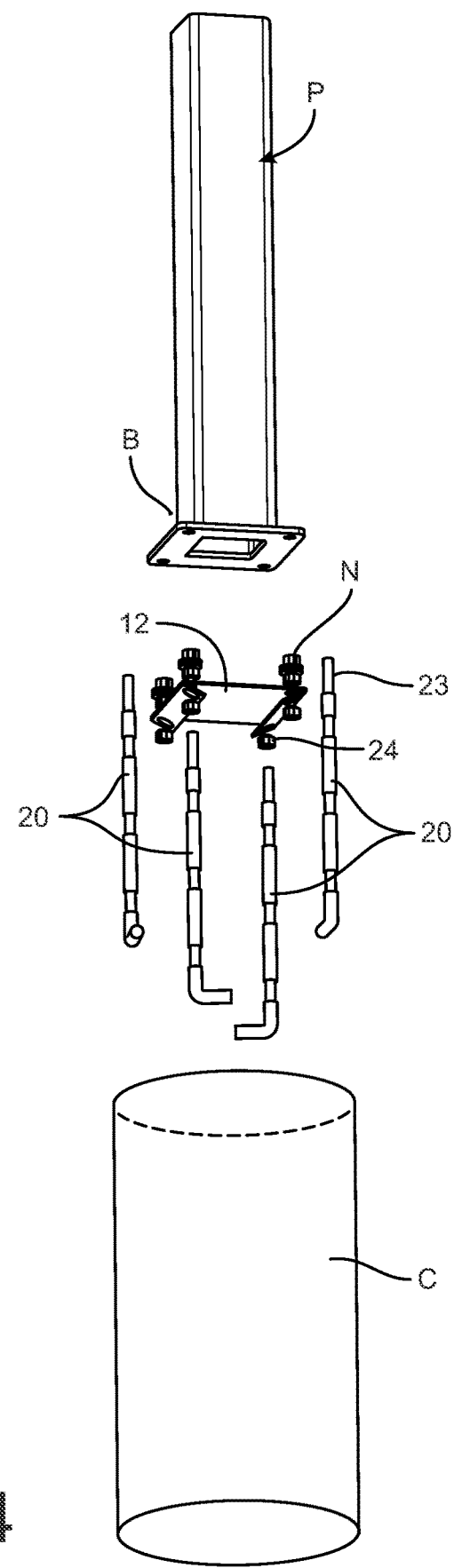
FIG. 4 is an exploded view of the anchoring system shown in FIG. 3.
Figure 6:
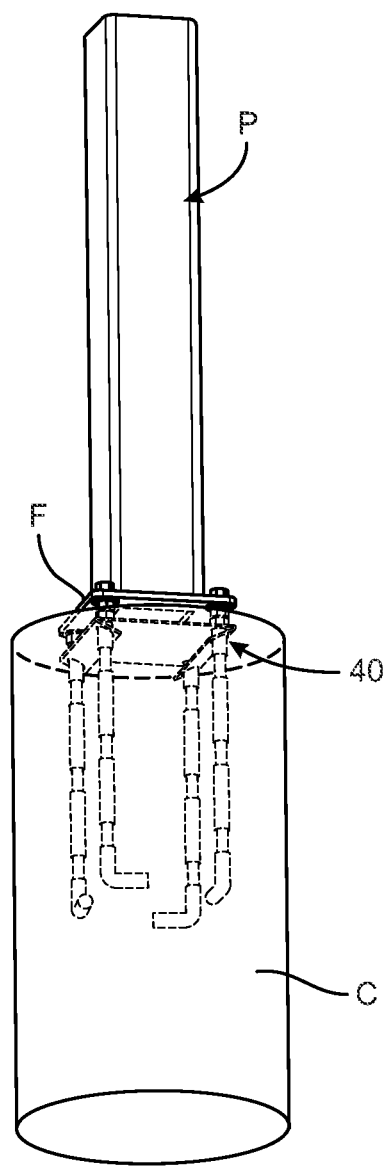
FIG. 6 is a cut-away view of the anchoring system of FIG. 1 with the anchoring bolt of FIG. 5 anchoring a post in concrete.

FIGS. 3, 4 and 6 show installations using the two embodiments of anchor bolts 20, 40. The first step in the installation is to mount the template 12 on the anchor bolts 20 by passing the bolts through the openings 17 and 18, with the threaded stem 23 of the bolts projecting above the surface of the plate 14. A nut 24 is threaded onto each threaded stem 23 to lock the anchor bolts to the template. It can be appreciated that the template 12 ensures proper bolt positioning for installation in the concrete body C due to the interaction between the plate portion 14 and the tabs 15. The nuts 24 can be selectively tightened onto the template 12 as another mechanism for tuning the vibration dampening performance of the anchoring system. It can further be appreciated that a nut does not need to be pre threaded onto the bolts before insertion to lock the bolts to the template.

The anchor bolts 20 are embedded within the concrete body C shortly after or while the concrete is poured into the ground. The template 12 is positioned at the surface of the concrete body C with the upper surface of the plate portion at the surface of the concrete body so that the nuts 24 are accessible to be tightened as necessary. The threaded stems 23 of the anchor bolts project upward to receive the mounting base plate B of the post P, which is added after the concrete body cures. Nuts N or washer/nut combinations are threaded onto the threaded stems 23 to fasten the post P to the anchoring system 10. It is understood that the base plate B is supported on the nuts 24, although washers can be interposed between a nut 24 and the base plate B to help vertically align the post P as needed.

As noted, the template 12 ensures that the anchor bolts are properly vertically oriented. The bent portions 22 provide pull-out resistance for the anchor bolts embedded in the concrete body B. However, over time certain anchor bolts may loosen slightly within the concrete body. In this instance, the nut 24 of the corresponding bolt can be readily tightened to draw the anchor bolt upward within the concrete body.

In an alternative configuration, the anchor system 10 can be modified as shown in FIG. 8 to include a central anchor bolt 20' that is fixed to the template 12 by a nut 24 on the top of the plate (not shown) and a nut 25 bearing against the bottom surface of the plate portion 14. The anchor bolt 20' does not include the coating 30, 50 because it is centrally located on the template and aligned with the central axis of the post P.

Figure 9:
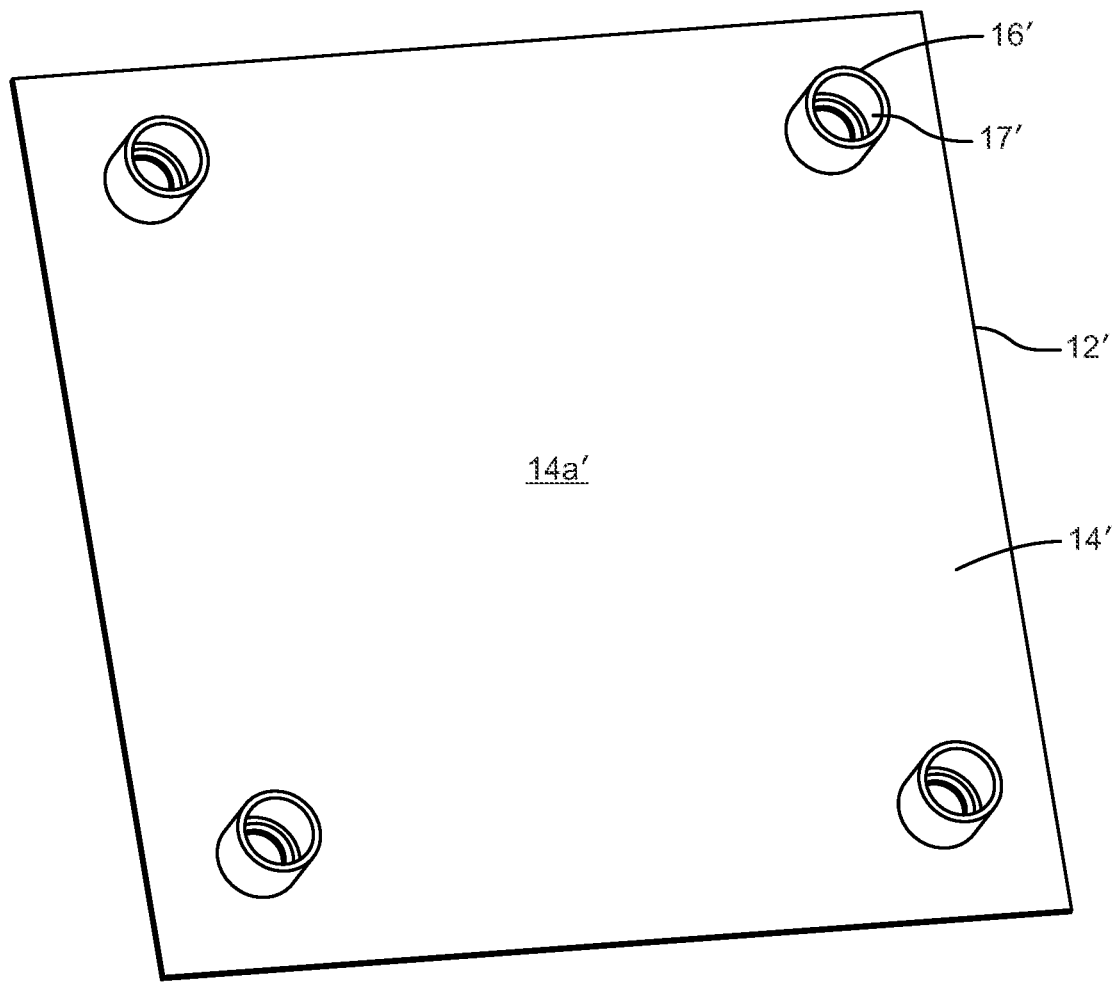
FIG. 9 is a bottom perspective view of another template plate for use in the anchoring system of FIG. 1.

The template 12 can incorporate other alignment features configured to properly align the anchor bolts perpendicularly relative to the bottom surface of the plate. In one embodiment, a modified template 12' shown in FIG. 9 can include a plate 14' with a plurality of cylindrical bosses 16' projecting from the bottom surface 14a' of the plate. Each boss 16' defines a bore 17' coincident with a plate opening and with the axis of the bore projecting perpendicular to the bottom surface of the plate. Each bore 17' is configured to receive an anchor bolts 20, 20' in a close fit. The bosses extend from the bottom surface 14a' by a sufficient amount to ensure that the bolts cannot deviate from perpendicular when they are fully inserted into the template 12. Thus, in one specific embodiment, the cylindrical bosses 16' extend one-two inches below the bottom surface 14a' of the plate. It is understood that the bosses are embedded within the concrete body C. The cylindrical bosses 16' can be affixed to the plate 14' in a conventional manner, such as by welding or adhering. Alternatively, the cylindrical bosses 16' can be provided with prongs (not shown) that extend through complementary slots in the plate 14' and that are bent against the upper surface of the plate to fasten the bosses to the plate.

Figure 10:
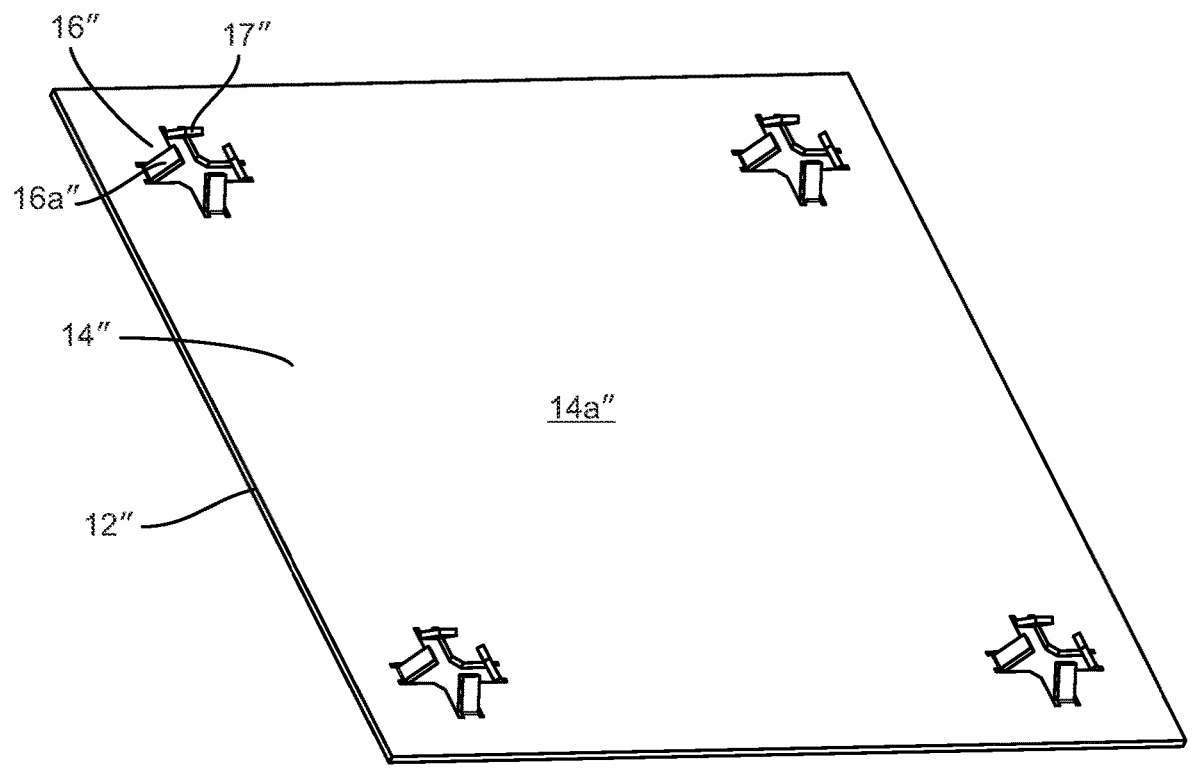
FIG. 10 is a bottom perspective view of yet another template plate for use in the anchoring system of FIG. 1.
Figure 11:
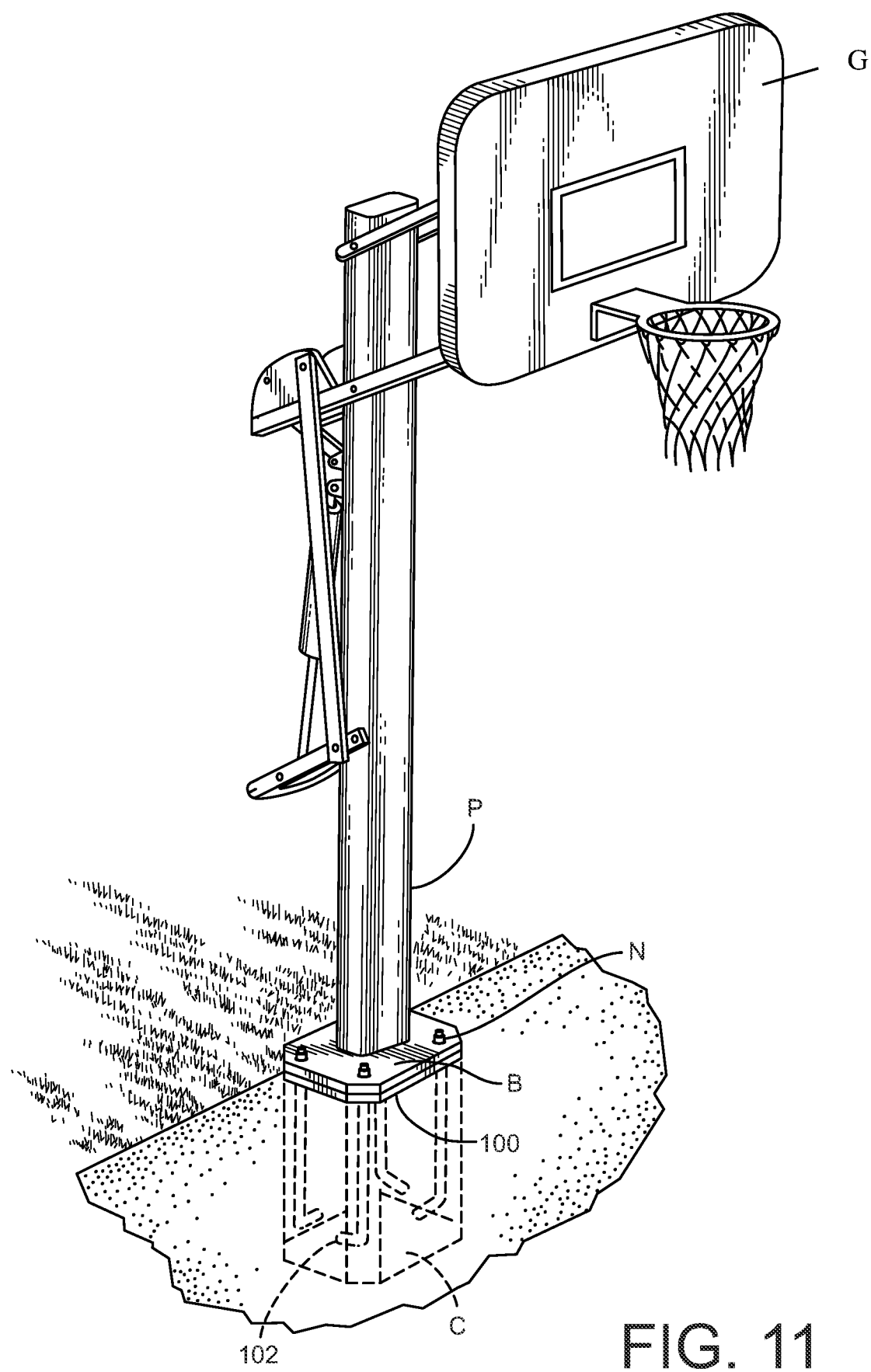
FIG. 11 is a perspective view of a basketball goal and anchoring system of the prior art.

A template 12" shown in FIG. 10 includes an alignment feature 16" in the form of prongs 16a" projecting from the bottom surface 14a" of the plate 14". At least three such prongs, and preferably four prongs 16a", are provided to define an effective opening 17" sized to receive an anchor bolt therethrough. The prongs 16" can be formed in the plate 14" by a conventional stamping operation, and then bent relative to the bottom surface 14a" to a predetermined angle, uniformly among all of the prongs, to form an opening 17" of a predetermined effective diameter. In one feature of the alignment prongs 16a", with the shank 21 of the anchor bolt 20 extending through the effective opening and with the nut 24 in contact with the upper surface of the plate 14", the prongs 16a" can be uniformly bent inward to engage the coating 30, 50 and/or surface of the bolt shank to secure the bolt's perpendicular position relative to the template 12".

The anchor system 10 of the present disclosure specifically contemplates some amount of movement of the anchor bolts 20, 40 within the concrete body C. This movement activates the vibration damping properties of the coating 30, 50 to dampen the vibrations of the post P. Since the polyurethane coating is buried in the concrete body C it is not exposed to the elements and therefore not susceptible to hardening and breaking down over time. The anchor bolts can be tuned to address the vibration profile of the specific post P being anchored. The entire anchor system 10 can be easily installed as described above.

The present disclosure should be considered as illustrative and not restrictive in character. It is understood that only certain embodiments have been presented and that all changes, modifications and further applications that come within the spirit of the disclosure are desired to be protected. For instance, while the disclosed examples pertain to an anchor system for a basketball goal, other posts P are contemplated that may be subjected to vibration, such as a tetherball or netball post. Furthermore, while the anchor bolts are described as L-shaped bolts, other forms are possible, such as a J-style anchor.

The present disclosure should be considered as illustrative and not restrictive in character. It is understood that only certain embodiments have been presented and that all changes, modifications and further applications that come within the spirit of the disclosure are desired to be protected.

What is claimed is:

1. An anchor system for anchoring a post to a concrete body, the post having a mounting flange with a plurality of bolt openings, the anchor system comprising:

a plate configured to be embedded in the concrete body with an upper surface of the plate immediately adjacent or exposed at a surface of the concrete body, the plate including a plurality of plate openings distributed around a perimeter of the plate to correspond to the bolt openings defined in the mounting flange of the post; and a plurality of bolts corresponding to the plurality of plate openings, each of the plurality of bolts including an elongated shank with a threaded stem at one end and a bent portion at the opposite end, the elongated shank sized and configured to extend through a corresponding plate opening of the plurality of plate opening with said threaded stem above the upper surface of the plate to engage a corresponding one of the bolt openings defined in the mounting flange of the post, and sized and configured so that the bent portion is embedded in the concrete body when the plate is embedded in the concrete body, wherein at least a portion of the elongated shank of each of at least one of the plurality of bolts, other than the threaded stem, includes a coating of a pre-cured elastomeric composition that has dampening properties; and a threaded nut engaged on the threaded stem of each of said plurality of bolts to bear against the upper surface of the plate.

2. The anchor system of claim 1, wherein said elastomeric composition is a polyurethane with a Shore A hardness of 50-90.

3. The anchor system of claim 1, wherein said elongated shank has a diameter and said coating has a thickness that is 5-75% of the diameter of the elongated shank.

4. The anchor system of claim 1, wherein said coating is applied at a uniform thickness around said at least a portion of the elongated shank.

5. The anchor system of claim 1, wherein said coating is applied along the entire length of said elongated shank except said threaded stem.

6. The anchor system of claim 1, wherein said coating is applied in two or more sections along the length of said elongated shank except said threaded stem, said two or more sections separated by a portion of the elongated shank without a coating.

7. The anchor system of claim 1, wherein said coating is applied to said bent portion of each of said plurality of bolts.

8. The anchor system of claim 1, wherein said elongated shank has a length of 10-40 inches.

9. The anchor system of claim 1, wherein said bent portion has a length of 1-2 inches and extends perpendicular to said elongated shank.

10. The anchor system of claim 1, wherein said threaded stem has a length of 2-3 inches.

11. The anchor system of claim 1, wherein said plate is rectangular and said plate openings are arranged at the corners of the plate.

12. The anchor system of claim 1, further comprising:
an alignment feature extending from an opposite bottom surface of said plate at each of said plate openings, wherein said alignment feature is configured to align each of said plurality of bolts extending through a corresponding one of said plurality of plate openings so that the elongated shank of the bolt is perpendicular to said bottom surface of said plate.

13. The anchor system of claim 12, wherein said alignment feature includes a plurality of tabs extending from the perimeter of the plate below said bottom surface of the plate, each of the plurality of tabs including a wing extending inward beneath the bottom surface of the plate, said wing including a wing opening, wherein a corresponding one of the plurality of tabs is arranged so that the wing opening is aligned with a corresponding one of the plurality of plate openings to orient the elongated shank of a corresponding one of the bolts perpendicularly relative to said bottom surface.

14. The anchor system of claim 12, wherein said alignment feature includes a plurality of prongs integral with said plate and angled from said bottom surface of said plate to define an effective opening aligned with a corresponding one of said plurality of openings, said effective opening sized to receive the elongated shank of a corresponding one of the bolts therethrough in a close fit.

15. The anchor system of claim 1, further comprising:
a center opening defined in said plate;
one of said plurality of bolts extending through said center opening; and
a pair of nuts engaged to said threaded stem of said one of said plurality of bolts, one nut of said pair of nuts bearing against the bottom surface of the plate and the other nut of said pair of nuts bearing against the upper surface of the plate.

16. A method for anchoring a post in the ground, the post having a mounting flange with a plurality of bolt openings, comprising:
providing a plate including a plurality of plate openings corresponding to the bolt openings defined in the mounting flange of the post;
providing a plurality of bolts, each including an elongated shank with a threaded stem at one end and a bent portion at the opposite end, at least a portion of the elongated shank, other than the threaded stem, of each of said plurality of bolts including a coating of a pre-cured elastomeric composition that has dampening properties;
inserting the threaded stem of one of the plurality of bolts through each of the plurality of plate openings;
engaging a threaded nut on the threaded stem of each of said plurality of bolts to bear against an upper surface of the plate;
pouring a concrete body within the ground with the plurality of bolts and the coating of the bolts embedded in the concrete body as it is poured, and with the plate embedded so that the upper surface of the plate is immediately adjacent or exposed at an exposed surface of the concrete body;
after the concrete body has cured, placing the mounting flange of the post on the threaded nuts threaded onto the plurality of bolts, with the threaded stem of the plurality of bolts extending through a corresponding one of the plurality of bolt openings; and
tightening a nut onto the threaded stem of each of the plurality of bolts to clamp the mounting flange onto the plate.

17. The method of claim 16, wherein:
the plate includes an alignment feature extending from a bottom surface of the plate, the alignment feature configured to orient the elongated shank of each of the plurality of bolts perpendicular to the bottom surface of the plate; and
the step of inserting the threaded stem includes first inserting the threaded stem through the alignment feature and then through a corresponding one of the plate openings.

18. The method of claim 16, wherein said elastomeric composition is a polyurethane with a Shore A hardness of 50-90.

19. The method of claim 16, wherein the elongated shank has a diameter and the coating has a thickness that is 5-75% of the diameter of the elongated shank.

20. The method of claim 16, wherein the coating is applied at a uniform thickness around the portion of the elongated shank.

* * * * *